(12) United States Patent
Jiang et al.

(10) Patent No.: US 11,438,651 B2
(45) Date of Patent: Sep. 6, 2022

(54) METHOD AND DEVICE FOR PICTURE QUALITY ASSESSMENT AFTER DYNAMIC PANORAMIC VIDEO STREAM CROPPING

(71) Applicant: KANDAO TECHNOLOGY CO., LTD., Shenzhen (CN)

(72) Inventors: Xiaoke Jiang, Shenzhen (CN); Daming Qiu, Shenzhen (CN); Rui Ma, Shenzhen (CN); Zhiyou Ma, Shenzhen (CN)

(73) Assignee: KANDAO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/264,302

(22) PCT Filed: Jul. 11, 2018

(86) PCT No.: PCT/CN2018/095329
§ 371 (c)(1),
(2) Date: Jan. 29, 2021

(87) PCT Pub. No.: WO2020/000522
PCT Pub. Date: Jan. 2, 2020

(65) Prior Publication Data
US 2021/0297737 A1    Sep. 23, 2021

(30) Foreign Application Priority Data

Jun. 27, 2018    (CN) .......................... 201810682272.2

(51) Int. Cl.
*H04N 21/442* (2011.01)
*H04N 19/154* (2014.01)
*H04N 21/44* (2011.01)

(52) U.S. Cl.
CPC ..... *H04N 21/44218* (2013.01); *H04N 19/154* (2014.11); *H04N 21/44008* (2013.01)

(58) Field of Classification Search
CPC .......... H04N 21/44218; H04N 19/154; H04N 21/44008; H04N 19/167; H04N 19/176; H04N 21/440263
See application file for complete search history.

(56) References Cited

U.S. PATENT DOCUMENTS 9,940,518 B1 *   4/2018   Klingstrom ............... G06T 7/60
10,419,738 B1 *  9/2019   Phillips ............ H04N 21/21805
(Continued)

FOREIGN PATENT DOCUMENTS

CN      106341683       1/2017
CN      107347153       11/2017
(Continued)

OTHER PUBLICATIONS

"International Search Report (Form PCT/ISA/210) of PCT/CN2018/095329", dated Mar. 27, 2019, with English translation thereof, pp. 1-4.

*Primary Examiner* — Fernando Alcon
(74) *Attorney, Agent, or Firm* — JCIP Global Inc.

(57) ABSTRACT

The present application provides a method and device for picture quality assessment after dynamic panoramic video stream cropping. An attention focus parameter is obtained, the attention focus parameter is used for representing an attention level of a user to a picture and the attention focus parameter is a function of a picture angle and a picture height; a resolution distribution parameter is obtained; the attention focus parameter and the resolution distribution parameter are combined to obtain a picture quality parameter that the user views in a dynamically cropped panoramic video stream; and the picture quality is assessed according to the picture quality parameter.

19 Claims, 5 Drawing Sheets

(56) References Cited

U.S. PATENT DOCUMENTS

| | | | |
|---|---|---|---|
| 10,970,811 B1* | 4/2021 | Aksoy | G06T 3/0012 |
| 2008/0181498 A1* | 7/2008 | Swenson | H04N 19/167 |
| | | | 382/173 |
| 2016/0073023 A1 | 3/2016 | Rondinelli et al. | |
| 2017/0339415 A1* | 11/2017 | Wang | H04L 65/607 |
| 2017/0374375 A1* | 12/2017 | Makar | H04N 19/597 |
| 2018/0027241 A1* | 1/2018 | Wu | H04N 19/124 |
| | | | 375/240.03 |
| 2018/0033405 A1* | 2/2018 | Tall | G09G 5/37 |
| 2018/0176535 A1* | 6/2018 | Ninan | G06F 3/013 |
| 2018/0190091 A1* | 7/2018 | Yuan | H04N 19/17 |
| 2019/0174125 A1* | 6/2019 | Ninan | H04N 13/139 |
| 2019/0200059 A1* | 6/2019 | Reif | H04N 21/8133 |
| 2019/0356894 A1* | 11/2019 | Oh | H04N 21/2662 |
| 2019/0387224 A1* | 12/2019 | Phillips | H04N 19/40 |
| 2020/0177927 A1* | 6/2020 | Yang | H04N 21/23439 |
| 2020/0389621 A1* | 12/2020 | Ryu | H04N 19/187 |
| 2021/0132688 A1* | 5/2021 | Kim | G02B 27/0093 |

FOREIGN PATENT DOCUMENTS

| | | |
|---|---|---|
| CN | 107483920 | 12/2017 |
| CN | 108055533 | 5/2018 |
| CN | 108810513 | 11/2018 |

* cited by examiner

METHOD AND DEVICE FOR PICTURE QUALITY ASSESSMENT AFTER DYNAMIC PANORAMIC VIDEO STREAM CROPPING

CROSS-REFERENCE TO RELATED APPLICATION

This application is a 371 of international application of PCT application serial no. PCT/CN2018/095329, filed on Jul. 11, 2018, which claims the priority benefit of China application no. 201810682272.2, filed on Jun. 27, 2018. The entirety of each of the above mentioned patent applications is hereby incorporated by reference herein and made a part of this specification.

Field

The present application relates to the field of multimedia technology, and in particular to a method and device for picture quality assessment after dynamic panoramic video stream cropping.

Background

With the development of video capture and processing technologies, a panoramic video has begun to step into people's lives. Panoramic video technology is developed from panoramic photography technology and is a video taken at all 360 degrees with a 3D camera, which carries a rich amount of information that allows changing scenes to be played in real time. People can freely select viewing angles in horizontal and vertical directions to browse scenes of interest in the panoramic video as if they were immersive.

A user can view the panoramic video through a VR headset, and a panoramic video player can perform stream cropping on the panoramic video picture for the user's view angle, e.g., the user views the front picture, and only part of the picture in front of the user can be transmitted to the VR headset for viewing.

To meet the higher visual experience of users, the panoramic video is increasingly demanding on picture quality, but the volume of panoramic video data is enormous, which obviously increases the difficulty of photographing and transmission of picture content, resulting in a display device's inability to smoothly play a high-resolution panoramic video, and an increasing play cost. With regard to the current state of a panoramic video with high picture quality, resolution reduction can be performed on part of the content of a picture to reduce shooting cost and play cost.

However, there is no standard in the prior art to assess picture quality of a panoramic video, which is either high in quality, but has large shooting cost and play cost, or can cause distortion of part of the scene of the panoramic video due to excessive resolution reduction, affecting the picture quality and play effect of the panoramic video.

Accordingly, it is necessary to provide a method and device for picture quality assessment after dynamic panoramic video stream cropping to solve the problems in the prior art.

SUMMARY

Embodiments of the present application provide a method and device for picture quality assessment after dynamic panoramic video stream cropping to address the technical problem that in the prior art, a panoramic video either has large shooting cost and play cost due to high quality requirement, or can cause distortion of part of the scene of the panoramic video due to excessive resolution reduction, affecting the picture quality and play effect of the panoramic video.

In a first aspect, the present application provides a method for picture quality assessment after dynamic panoramic video stream cropping, including:

catching sight lines of eyes of a user and obtaining a position of an attention focus position of the user in a picture to obtain an attention focus parameter of the user, the attention focus parameter being used for representing an attention level of the user to the picture, and the attention focus parameter being a function of the attention focus position of the user;

generating a resolution estimated value of the attention focus position of each user of a video picture according to the attention focus parameter, and generating a resolution distribution parameter according to the resolution estimated value of the attention focus position of each user of a video picture, the resolution distribution parameter being used for representing the resolution distribution, the resolution distribution parameter being a function of the attention focus position of the user, wherein the attention focus position of the user includes a picture horizontal angle and/or a picture vertical angle;

combining the attention focus parameter and the resolution distribution parameter to obtain a picture quality parameter; and assessing the picture quality of a panoramic video that the user views currently according to the picture quality parameter.

In a second aspect, the present application provides a method for picture quality assessment after dynamic panoramic video stream cropping, including:

obtaining an attention focus parameter, the attention focus parameter being used for representing an attention level of a user to a picture, and the attention focus parameter being a function of an attention focus position of the user;

obtaining a resolution distribution parameter, the resolution distribution parameter being used for representing the resolution distribution of the picture, and the resolution distribution parameter being a function of the attention focus position of the user, wherein the attention focus position of the user includes a picture horizontal angle and/or a picture vertical angle;

combining the attention focus parameter and the resolution distribution parameter to obtain a picture quality parameter; and assessing the picture quality of a panoramic video that the user views currently according to the picture quality parameter.

In one embodiment, the obtaining the resolution distribution parameter specifically comprises: generating a resolution estimated value of the attention focus position of each user of a video picture according to the attention focus parameter, and generating the resolution distribution parameter according to the resolution estimated value of the attention focus position of each user of the video picture.

In one embodiment, the combining the attention focus parameter and the resolution distribution parameter to obtain the picture quality parameter specifically comprises: integrating the attention focus parameter and the resolution distribution parameter to obtain the picture quality parameter.

In one embodiment, the integrating the attention focus parameter and the resolution distribution parameter to obtain the picture quality parameter specifically comprises:

integrating the attention focus parameter and the resolution distribution parameter over the picture horizontal angle to obtain a picture quality parameter Q of each frame, $Q=\int_0^{2\pi} F(x)P(x)dx$, wherein, F(x) is the attention focus parameter, P(x) is the resolution distribution parameter, and the attention focus position of the user comprises the picture horizontal angle; or integrating the attention focus parameter and the resolution distribution parameter over the picture horizontal angle and the picture vertical angle to obtain a picture quality parameter Q of each frame, $Q=\int_0^{2\pi}\int_0^{\pi} F(x,y)P(x,y)dxdy$, wherein, F(x, y) is the attention focus parameter, P(x, y) is the resolution distribution parameter, and the attention focus position of the user comprises the picture horizontal angle and the picture vertical angle.

In one embodiment, the integrating the attention focus parameter and the resolution distribution parameter to obtain the picture quality parameter specifically comprises:

integrating the attention focus parameter and the resolution distribution parameter over the picture horizontal angle, the picture vertical angle and a play time of the panoramic video to obtain a picture quality parameter Q of the panoramic video in a period of the play time, $Q=\int_0^{2\pi}\int_0^{\pi}\int_0^{Te} F_t(x,y)P_t(x,y)dxdydt$, wherein, $F_t(x, y)$ is the attention focus parameter in the play time of the panoramic video, $P_t(x, y)$ is the resolution distribution parameter in the play time of the panoramic video, Te is a play end time of the video, and the attention focus position of the user comprises the picture horizontal angle and the picture vertical angle.

In one embodiment, the obtaining the attention focus parameter specifically comprises: catching sight lines of eyes of a user and obtaining a position of an attention focus position of the user in a picture to obtain an attention focus parameter of the user.

In one embodiment, the obtaining the attention focus parameter specifically comprises: obtaining an attention focus position of a single user to obtain the attention focus parameter; or obtaining attention focus positions of a plurality of users and obtaining the attention focus parameter according to the attention focus positions of a plurality of users, correspondingly, the obtaining the resolution distribution parameter specifically comprises: generating a corresponding resolution estimated value of the attention focus position of each user of a video picture according to the attention focus parameters, and generating a corresponding resolution distribution parameter according to the resolution estimated value of the attention focus position of each user of a video picture.

In a third aspect, the present application provides a device for picture quality assessment after dynamic panoramic video stream cropping, including:

an obtaining module, configured to obtain an attention focus parameter and a resolution distribution parameter; the attention focus parameter being used for representing an attention level of a user to a picture; the resolution distribution parameter being used for representing the resolution distribution of the picture; both of the attention focus parameter and the resolution distribution parameter being a function of an attention focus position of the user; and the attention focus position of the user including a picture horizontal angle and/or a picture vertical angle;

a combining module, configured to combine the attention focus parameter and the resolution distribution parameter obtained by the obtaining module to obtain a picture quality parameter; and an assessing module, configured to assess the picture quality of a panoramic video that the user views currently according to the picture quality parameter obtained by the combining module.

In one embodiment, the obtaining module is specifically configured to, when obtaining the resolution distribution parameter, execute: generating a resolution estimated value of the attention focus position of each user of a video picture according to the obtained attention focus parameter, and generating the resolution distribution parameter according to the resolution estimated value of the attention focus position of each user of a video picture.

In one embodiment, the combining module being configured to integrate the attention focus parameter and the resolution distribution parameter obtained by the obtaining module to obtain the picture quality parameter, specifically comprises:

integrating the attention focus parameter and the resolution distribution parameter over the picture horizontal angle to obtain a picture quality parameter Q of each frame, $Q=\int_0^{2\pi} F(x)P(x)dx$, wherein, F(x) is the attention focus parameter, P(x) is the resolution distribution parameter, and the attention focus position of the user comprises the picture horizontal angle; or integrating the attention focus parameter and the resolution distribution parameter over the picture horizontal angle and the picture vertical angle to obtain a picture quality parameter Q of each frame, $Q=\int_0^{2\pi}\int_0^{\pi} F(x,y)P(x,y)dxdy$, wherein, F(x, y) is the attention focus parameter, P(x, y) is the resolution distribution parameter, and the attention focus position of the user comprises the picture horizontal angle and the picture vertical angle; or integrating the attention focus parameter and the resolution distribution parameter over the picture horizontal angle, the picture vertical angle and a play time of the panoramic video to obtain a picture quality parameter Q of the panoramic video in a period of the play time, $Q=\int_0^{2\pi}\int_0^{\pi}\int_0^{Te} F_t(x,y)P_t(x,y)dxdydt$, wherein, $F_t(x, y)$ is the attention focus parameter in the play time of the panoramic video, $P_t(x, y)$ is the resolution distribution parameter in the play time of the panoramic video, Te is a play end time of the video, and the attention focus position comprises the picture horizontal angle and the picture vertical angle.

The method and device for picture quality assessment after dynamic panoramic video stream cropping provided in the present application introduce an attention focus parameter and a resolution distribution parameter to assess the picture quality of a panoramic video, and the attention focus parameter and the resolution distribution parameter are combined to assess the picture quality; the present application provides a standard to assess the picture quality for reference, and guarantees the picture quality and play effect of the panoramic video, wherein the attention focus parameter can represent the attention level of the user to the picture, and the resolution distribution parameter can represent the resolution distribution of the picture; the assessment results are closer to the real experience of the user, the picture quality can be assessed accurately, and the assessment effect is good, in favor of an improved user experience.

BRIEF DESCRIPTION OF THE DRAWINGS

The present application will now be explained in further detail with reference to the drawings and embodiments.

DETAILED DESCRIPTION OF THE EMBODIMENTS

The technical solutions in embodiments of the present application will now be clearly and fully described in conjunction with the accompanying drawings in embodiments of the present application, and it will be apparent that the described embodiments are only some, but not all, embodiments of the present application. Based on the embodiments in the present application, all other embodiments obtained by a person skilled in the art without creative work fall within the scope of protection of the present application.

A method and device for picture quality assessment after dynamic panoramic video stream cropping provided in the present application introduce an attention focus parameter and a resolution distribution parameter to assess the picture quality of a panoramic video, and the attention focus parameter and the resolution distribution parameter are combined to assess the picture quality; the present application provides a standard to assess the picture quality for reference, and guarantees the picture quality and play effect of the panoramic video, wherein the attention focus parameter can represent the attention level of the user to the picture, and the resolution distribution parameter can represent the resolution distribution of the picture; the assessment results are closer to the real experience of the user, the picture quality can be assessed accurately, and the assessment effect is good, in favor of an improved user experience.

The method for picture quality assessment after dynamic panoramic video stream cropping provided in the present application will be described in detail with reference to specific embodiments. The method includes the following steps: obtaining an attention focus parameter, the attention focus parameter being used for representing an attention level of a user to a picture, and the attention focus parameter being a function of an attention focus position of the user; obtaining a resolution distribution parameter, the resolution distribution parameter being used for representing the resolution distribution of the picture, and the resolution distribution parameter being a function of the attention focus position of the user, wherein the attention focus position of the user includes a picture horizontal angle and/or a picture vertical angle; combining the attention focus parameter and the resolution distribution parameter to obtain a picture quality parameter; and assessing the picture quality according to the picture quality parameter.

Figure 1:
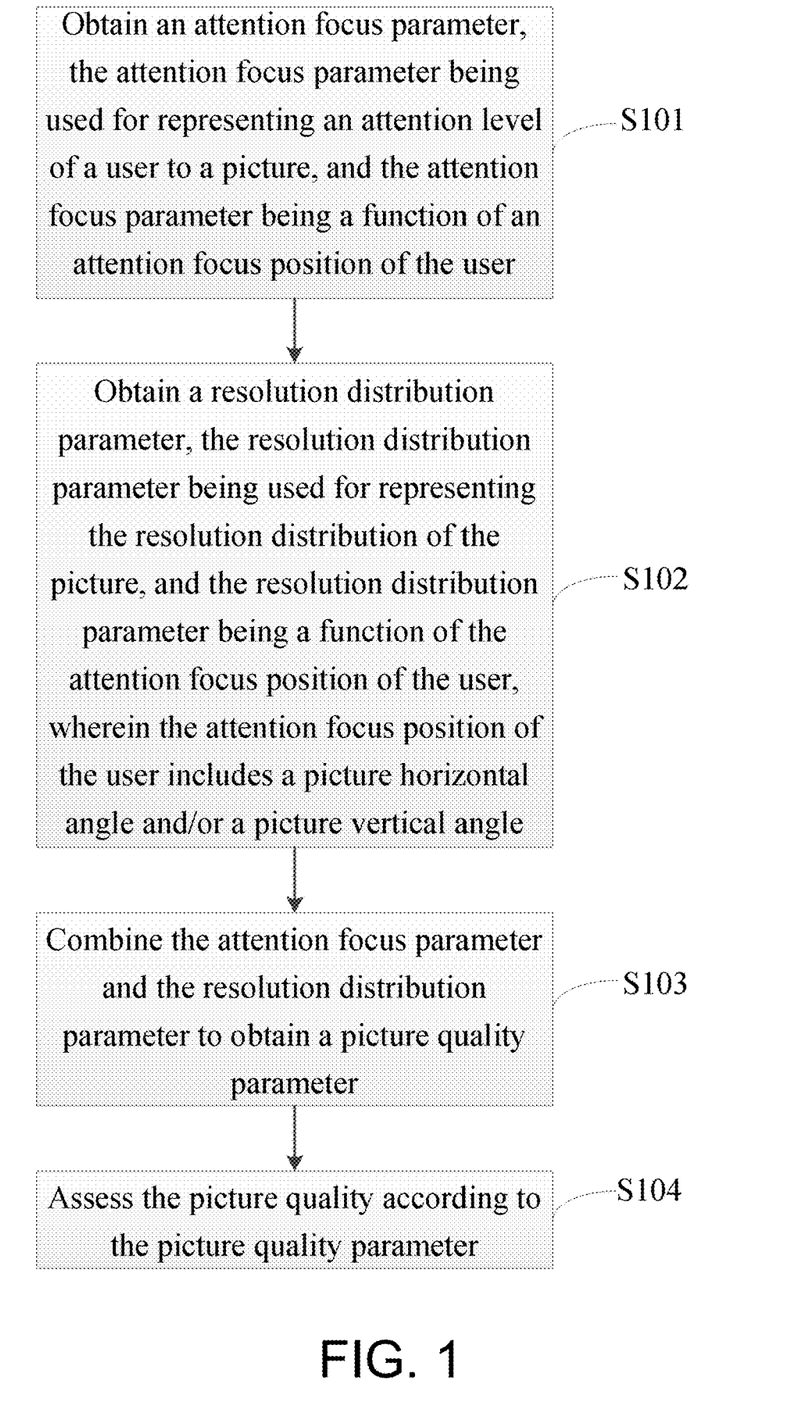
FIG. 1 is a flow chart of a method for picture quality assessment after dynamic panoramic video stream cropping according to the present application.

Referring to FIG. 1, FIG. 1 is a flow chart of implementation of a method for picture quality assessment after dynamic panoramic video stream cropping provided in an embodiment of the present application, and the method may include:

S101, an attention focus parameter is obtained, the attention focus parameter being used for representing an attention level of a user to a picture, and the attention focus parameter being a function of an attention focus position of the user.

A panoramic video can provide a 360-degree view angle for a user, however, the user can only focus, at a certain time, a certain position in the picture, which is an attention focus position of eyes of the user and represents the vertical and horizontal angles of focus of eyes of the user in the whole picture; the present application describes these two parameters as the picture horizontal angle and the picture vertical angle, respectively, that is, the attention focus parameter may be a function of the picture horizontal angle, a function of the picture vertical angle, or a function of the picture horizontal angle and the picture vertical angle, and the attention focus parameter may be used for representing the attention level of the user to the picture.

The attention focus parameter of the embodiment of the present application may be a function such as a Gaussian function. The attention focus parameter may be specifically expressed as F(x), wherein, x represents the picture horizontal angle or the picture vertical angle, and the value range of x may be 0-360 degrees (2π); or as F(x, y), wherein, x and y represent the picture horizontal angle and the picture vertical angle, respectively, and the value ranges of x and y may be 0-360 degrees (2π). It should be noted that when the user views a panoramic video, the user may adjust his/her position to realize 36-degree angle transformation in the horizontal direction and the vertical direction, so that the value ranges of the picture horizontal angle and the picture vertical angle may be 0-360 degrees. However, in the actual application, the user may only be interested in a picture in front of the body in the vertical direction, and therefore, the value range of the picture vertical angle may be 0-180 degrees (π).

The embodiments of the present application focus on the positions where eyes of the user will view, which is closer to the real experience of the user.

It will be appreciated that the attention focus positions of different users may slightly vary, resulting in different attention focus parameters obtained by different users. To address the problem, in an alternative embodiment, there may be two ways of obtaining the attention focus parameter; one is to obtain the attention focus position of a single user and obtain the attention focus parameter according to a functional relationship, and therefore, a viewing habit of the user can be obtained to collect a personalized feature of the user; and the other is to obtain the attention focus positions of a plurality of users, data of a plurality of users can be counted, thereby displaying the personalized features of the panoramic video better.

It should be noted that the attention focus parameter of the user may be obtained in other ways, for example, attention focus parameters of a large number of users are obtained by using big data collection to obtain attention focus parameters of general users, thereby satisfying the viewing needs of most users. A correction value may also be introduced to correct the obtained attention focus parameter, and the corrected attention focus parameter is used for assessing the picture quality.

In an alternative embodiment, in order to reduce the amount of computation, the picture of the panoramic video may be divided into a plurality of regions, for example, circular regions or regions in other shapes according to the attention focus position of the user. When the attention focus position of the user is in the same circular region, there is the same attention focus parameter. For example, sight lines of eyes of the user are caught to obtain the attention focus position of the user being the picture horizontal angle of 60 degrees and the picture vertical angle of 150 degrees, and therefore, the attention focus parameter is a function of 60 degrees and 150 degrees.

S102, a resolution distribution parameter is obtained, the resolution distribution parameter being used for representing the resolution distribution of the picture, and the resolution distribution parameter being a function of the attention focus position of the user.

The resolution distribution parameter may be used for representing the resolution distribution of the picture, and the resolution distribution parameter may be a function of the picture horizontal angle, a function of the picture vertical angle, or a function of the picture horizontal angle and the picture vertical angle. The resolution distribution parameter of the embodiment of the present application may be a function such as a square-edged function, which may specifically be expressed as $P(x)$, wherein, x represents the picture horizontal angle or the picture vertical angle, and the value range of x may be 0-360 degrees; or as $P(x, y)$, wherein, x and y represent the picture horizontal angle and the picture vertical angle, respectively, and the value ranges of x and y may be 0-360 degrees and 0-180 degrees, respectively. $P(x)$ is the resolution distribution parameter obtained according to the current picture horizontal angle or picture vertical angle of the user, and $P(x, y)$ is the resolution distribution parameter obtained according to the current picture horizontal angle and picture vertical angle.

In an alternative embodiment, the resolution distribution parameter may be obtained by a resolution estimated value and the attention focus position, that is, specific steps of obtaining the resolution distribution parameter may include: generating a resolution estimated value of the attention focus position of each user of a video picture according to the attention focus parameter, and generating the resolution distribution parameter according to the resolution estimated value of the attention focus position of each user of a video picture. The video picture herein may be part of video picture of a 360-degree panoramic video, such as a picture of a 120-degree panoramic video right ahead.

The resolution distribution of the attention focus position of the user may not be fully synchronized with the attention focus parameter, resulting in the picture quality parameter obtained in the following steps not satisfying the requirement, and the embodiment may adjust the resolution distribution parameter by adjusting the resolution estimated value, thereby achieving an adjustment to the picture quality.

In an alternative embodiment, if the attention focus positions of a plurality of users are obtained in S101, a corresponding resolution estimated value of the attention focus position of each user of the video picture may be generated according to the attention focus parameters in S102, and a corresponding resolution distribution parameter is generated according to the resolution estimated value of the attention focus position of each user of the video picture.

In an alternative embodiment, in order to reduce the amount of computation, the picture of the panoramic video may be divided into a plurality of regions to set different resolutions (the resolutions are preset). For example, the regions are represented in rectangular regions or regions in other shapes, the same rectangular region has the same resolution, is divided in high, medium and low resolutions, or represented in a specific resolution value. The corresponding resolution distribution is a high-resolution region when the picture horizontal angle is 60 degrees and the picture vertical angle is 150 degrees, and the resolution distribution parameter $P(x, y)$ is obtained by taking the resolution distribution of the high-resolution region.

In the prior art, since it is not clear which picture content is the picture that the user has greater interest in, and it is less known how to make quality adjustments to the picture that the user is interested in, embodiments of the present application introduce the attention focus parameter and the resolution distribution parameter, taking into account the personalized needs of different groups of people, and the integrity of the picture.

In the embodiment, the timing sequences of S101 and S102 are not limited, one of S101 and S102 may be performed prior to the other, or S101 and S102 are performed at the same time.

S103, the attention focus parameter and the resolution distribution parameter are combined to obtain a picture quality parameter.

In an alternative embodiment, the attention focus parameter and the resolution distribution parameter may be combined by integrating the attention focus parameter and the resolution distribution parameter. It will be appreciated that other mathematical operations may be used for combining, and that the integration operation provided in embodiments of the present application is an alternative implementation.

According to the present application, the picture quality parameter of each frame or the picture quality parameter of the whole panoramic video in the play time can be obtained by combining the attention focus parameter and the resolution distribution parameter, and specific implementation will be explained in the following embodiments.

S104, the picture quality is assessed according to the picture quality parameter.

The picture quality parameter obtained in S103 is compared with a preset picture quality parameter threshold value to assess the picture quality. In an alternative embodiment, the picture quality parameter is compared with a picture quality parameter threshold value, when the picture quality parameter is not less than the picture quality parameter threshold value, it is assessed that the picture quality satisfies the quality requirement, the picture may directly be input for audience viewing; when the picture quality parameter is less than the picture quality parameter threshold value, it is assessed that the picture quality does not satisfy the quality requirement, the picture may be adjusted, for example, the resolution estimated value may be adjusted, or stream cropping is performed on the picture according to the attention focus position of the user to enable the picture quality to satisfy the quality requirement. When the picture quality is too high, the picture quality may properly be reduced to reduce the play cost.

Further, in S103, the attention focus parameter and the resolution distribution parameter may be combined by integrating the attention focus parameter and the resolution distribution parameter. Specific operation may at least include the following cases:

in an alternative embodiment, when there is a very small difference in the attention of the user to the picture content in the vertical direction, the attention focus position of the user includes the picture horizontal angle, the attention focus parameter and the resolution distribution parameter may be integrated only over the picture horizontal angle to obtain the picture quality parameter Q of each frame, and the operation expression may be $Q=\int_0^{2\pi} F(x)P(x)dx$, wherein, $F(x)$ is the attention focus parameter, $P(x)$ is the resolution distribution parameter, and the value range of the picture horizontal angle is $0$-$2\pi$; and in an alternative embodiment, when the user has more attentions on the picture content in the vertical direction and the picture content in the horizontal direction, that is, there is a greater difference in the vertical content and horizontal content of the picture, in order to better guarantee the accuracy of picture quality assessment, the attention focus position of the user includes the picture horizontal angle and the picture vertical angle, the attention focus parameter and the resolution distribution parameter are integrated over the picture horizontal angle and the picture vertical angle to obtain the picture quality parameter Q of each picture, and the operation expression may be $Q=\int_0^{2\pi}\int_0^{\pi}F(x,y)P(x,y)dxdy$, wherein, F(x, y) is the attention focus parameter, P(x, y) is the resolution distribution parameter, and the value angles of the picture horizontal angle and the picture vertical angle are 0-2π and 0-π, respectively.

The above two alternative embodiments mainly assess the picture quality of each frame of the panoramic video; if the whole panoramic video is subject to quality assessment, operation is performed after addition of the play time of the video to obtain the picture quality parameter of the panoramic video in the period of the play time, and the operation expression may be $Q=\int_0^{2\pi}\int_0^{\pi}\int_0^{Te}F_t(x,y)P_t(x,y)dxdydt$, where $F_t(x, y)$ is the attention focus parameter in the play time of the panoramic video, $P_t(x, y)$ is the resolution distribution parameter in the play time of the panoramic video, Te is the play time of the video, it should be noted that Te herein may be the end time frame of video stream, and the value ranges of the picture horizontal angle and the picture vertical angle are 0-2π and 0-π, respectively.

The picture quality parameter is obtained according to data of a single user. In the embodiment, the picture quality may be assessed according to a calculation result of a single user, and the picture quality may also be assessed according to calculation results of a plurality of users. If the picture quality is assessed according to calculation results of a plurality of users, an average picture quality parameter may be obtained by averaging after the picture quality parameters of a plurality of users are obtained, and the picture quality is assessed according to the average picture quality parameter, namely the picture quality of a video picture generated by the current picture stream cropping mode is assessed.

The method and device for picture quality assessment after dynamic panoramic video stream cropping provided in the present application introduce an attention focus parameter and a resolution distribution parameter to assess the picture quality of a panoramic video, and the attention focus parameter and the resolution distribution parameter are combined to assess the picture quality; the present application provides a standard to assess the picture quality for reference, and guarantees the picture quality and play effect of the panoramic video, wherein the attention focus parameter can represent the attention level of the user to the picture, and the resolution distribution parameter can represent the resolution distribution of the picture; the assessment results are closer to the real experience of the user, the picture quality can be assessed accurately, and the assessment effect is good, in favor of an improved user experience.

Figure 2:
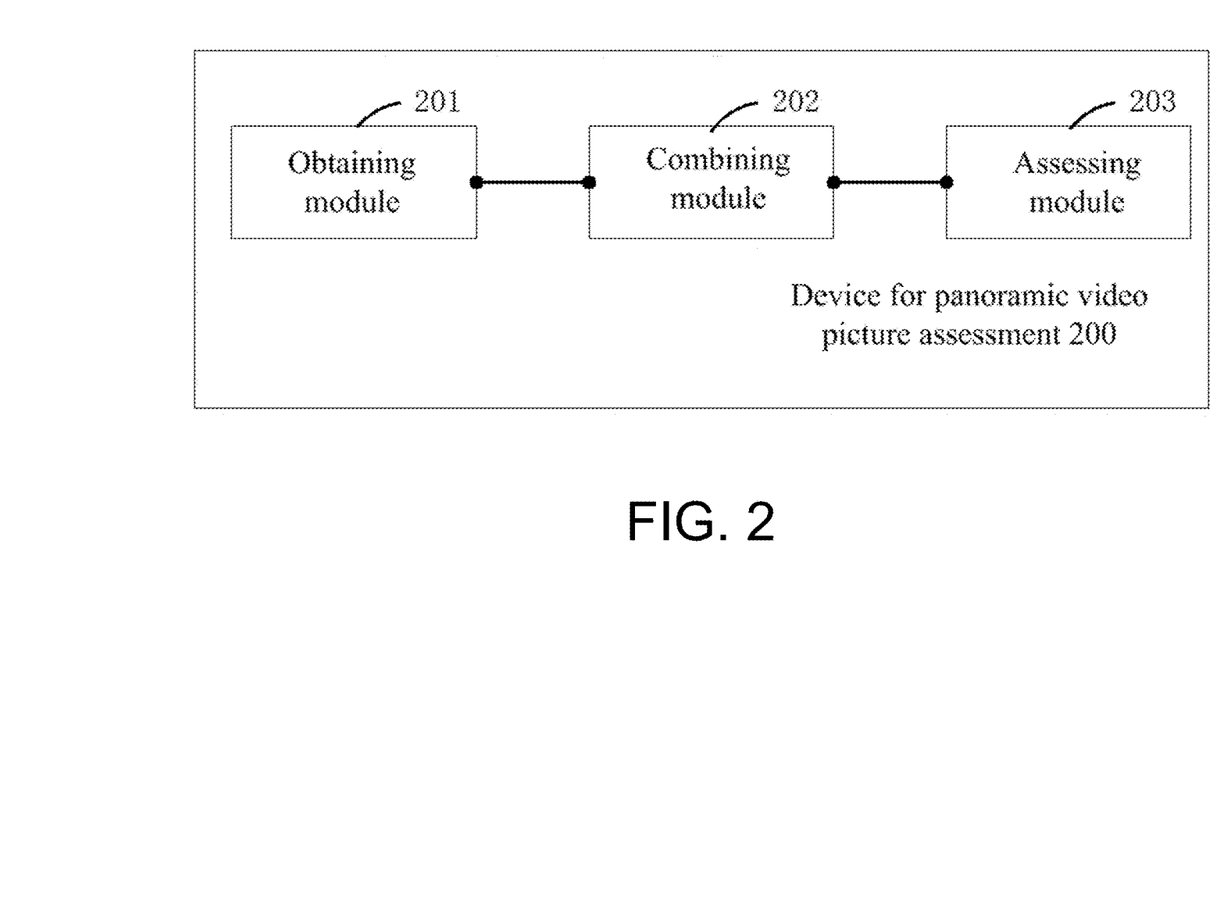
FIG. 2 is a schematic diagram showing the structure of a device for picture quality assessment after dynamic panoramic video stream cropping according to the present application.

In addition, embodiments of the present application further provide a device 200 for picture quality assessment after dynamic panoramic video stream cropping, mainly including an obtaining module 201, a combining module 202, and an assessing module 203.

Referring to FIG. 2, FIG. 2 is a schematic diagram showing the structure of a device 200 for picture quality assessment after dynamic panoramic video stream cropping provided in the embodiment of the present application, and the device may include:

an obtaining module 201, configured to obtain an attention focus parameter and a resolution distribution parameter; the attention focus parameter being used for representing an attention level of a user to a picture; the resolution distribution parameter being used for representing the resolution distribution of the picture; both of the attention focus parameter and the resolution distribution parameter being a function of an attention focus position of the user;

a combining module 202, configured to combine the attention focus parameter and the resolution distribution parameter obtained by the obtaining module 201 to obtain a picture quality parameter; and an assessing module 203, configured to assess the picture quality according to the picture quality parameter obtained by the combining module 202.

In an alternative embodiment, the resolution distribution parameter may be obtained by a resolution estimated value and the attention focus position. The obtaining module 201 is specifically configured to, when obtaining the resolution distribution parameter, execute: generating a resolution estimated value of the attention focus position of each user of a video picture according to the obtained attention focus parameter, and generating the resolution distribution parameter according to the resolution estimated value of the attention focus position of each user of a video picture.

The attention focus parameter and the resolution distribution parameter of the embodiment may specifically be expressed as F(x) and P(x), wherein, x represents the picture horizontal angle or the picture vertical angle, and the value range of x may be 0-360 degrees (2π); or as F(x, y) and P(x, y), wherein, x and y represent the picture horizontal angle and the picture vertical angle, respectively, and the value ranges of x and y may be 0-360 degrees (2π) and 0-180 degree (0-π), respectively. P(x) is the resolution distribution parameter obtained according to the current picture horizontal angle or picture vertical angle of the user, and P(x, y) is the resolution distribution parameter obtained according to the current picture horizontal angle and picture vertical angle.

In an alternative embodiment, the combining module 202, configured to integrate the attention focus parameter and the resolution distribution parameter to obtain a picture quality parameter, specifically includes:

when there is a very small difference in the attention of the user to the picture content in the vertical direction, the attention focus position of the user includes the picture horizontal angle, the attention focus parameter and the resolution distribution parameter may be integrated only over the picture horizontal angle to obtain the picture quality parameter Q of each frame, and the operation expression may be $Q=\int_0^{2\pi}F(x)P(x)dx$, wherein, F(x) is the attention focus parameter, and P(x) is the resolution distribution parameter; and when the user has more attentions on the picture content in the vertical direction and the picture content in the horizontal direction, that is, there is a greater difference in the vertical content and horizontal content of the picture, in order to better guarantee the accuracy of picture quality assessment, the attention focus position of the user includes the picture horizontal angle and the picture vertical angle, the attention focus parameter and the resolution distribution parameter are integrated over the picture horizontal angle and the picture vertical angle to obtain the picture quality parameter Q of each picture, and the operation expression may be $Q=\int_0^{2\pi}\int_0^{\pi}F(x,y)P(x,y)dxdy$, wherein, F(x, y) is the attention focus parameter, and P(x, y) is the resolution distribution parameter.

The above two alternative embodiments mainly assess the picture quality of each frame of the panoramic video; if the whole panoramic video is subject to quality assessment, operation is performed after addition of the play time of the video to obtain the picture quality parameter of the panoramic video in the period of the play time, and the operation expression may be $Q=\int_0^{2\pi}\int_0^{\pi}\int_0^{Te}F_2(x,y)P_t(x,y)dxdydt$, wherein, $F_t(x, y)$ is the attention focus parameter in the play time of the panoramic video, $P_t(x, y)$ is the resolution distribution parameter in the play time of the panoramic video, Te is the play time of the video, and it should be noted that Te herein may be the end time frame of video stream.

In an alternative embodiment, the obtaining module 201 is configured to catch sight lines of eyes of a user and obtain a position of the attention focus position of the user in a picture to obtain an attention focus parameter of the user. Optionally, the attention focus position of a single user may be obtained, or the attention focus positions of a plurality of users may be obtained. When the attention focus positions of a plurality of users are obtained, a plurality of attention focus parameters and resolution distribution parameters may be obtained accordingly.

In order to reduce the amount of computation, the picture of the panoramic video may be divided into a plurality of regions, for example, circular regions or regions in other shapes according to the attention focus position of the user. When the attention focus position of the user is in the same circular region, there is the same attention focus parameter. The picture of the panoramic video may also be divided into a plurality of regions to set different resolutions (the resolutions are preset). For example, the regions are represented in rectangular regions or regions in other shapes, the same rectangular region has the same resolution, is divided in high, medium and low resolutions, or represented in a specific resolution value.

Further, the embodiment also includes an adjusting module, and the adjusting module may adjust the picture upon assessment that the picture quality does not satisfy the quality requirement. For example, the resolution estimated value may be adjusted, or stream cropping is performed on the picture according to the attention focus position of the user to enable the picture quality to satisfy the quality requirement. When the picture quality is too high, the picture quality may properly be reduced to reduce the play cost.

It should be noted that specific implantations of device embodiments of the present application can refer to the method embodiments described above, and will not be repeated herein.

Figure 3:
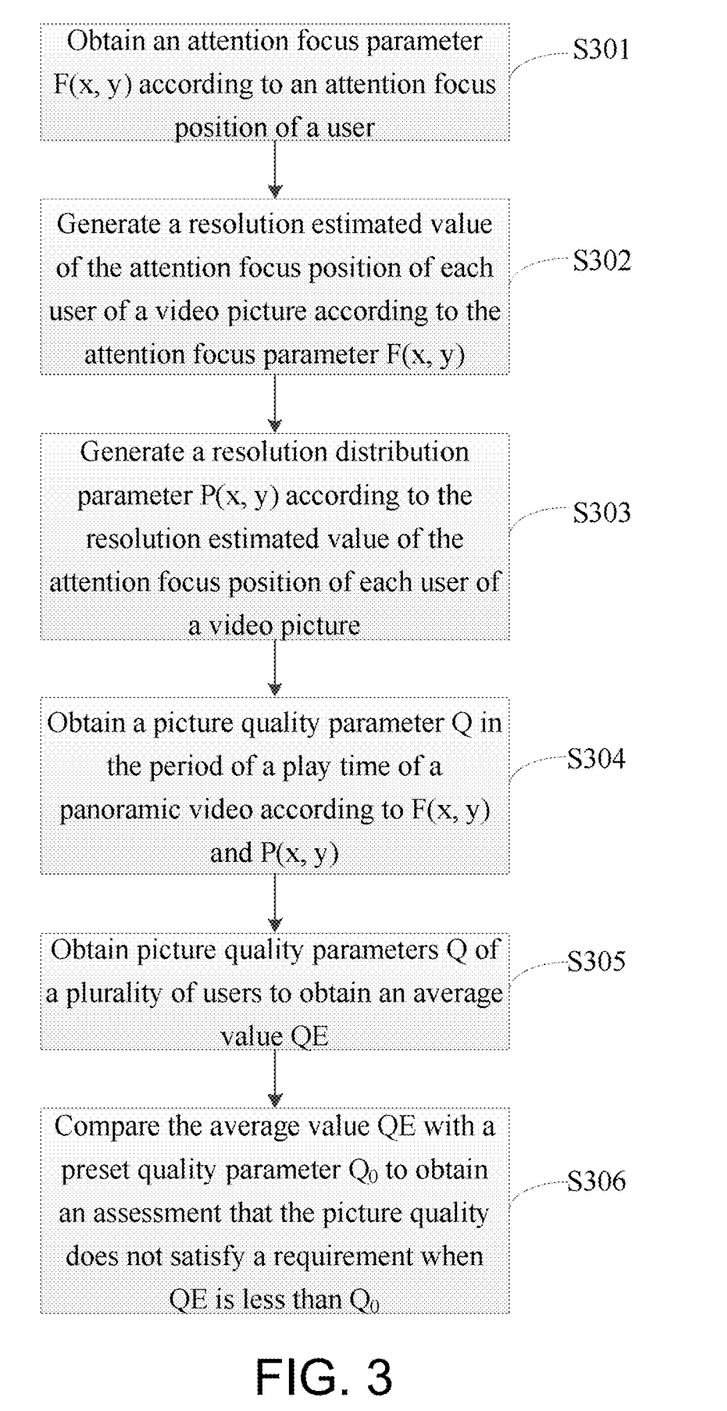
FIG. 3 is a flow chart of another method for picture quality assessment after dynamic panoramic video stream cropping according to the present application.
Figure 4:
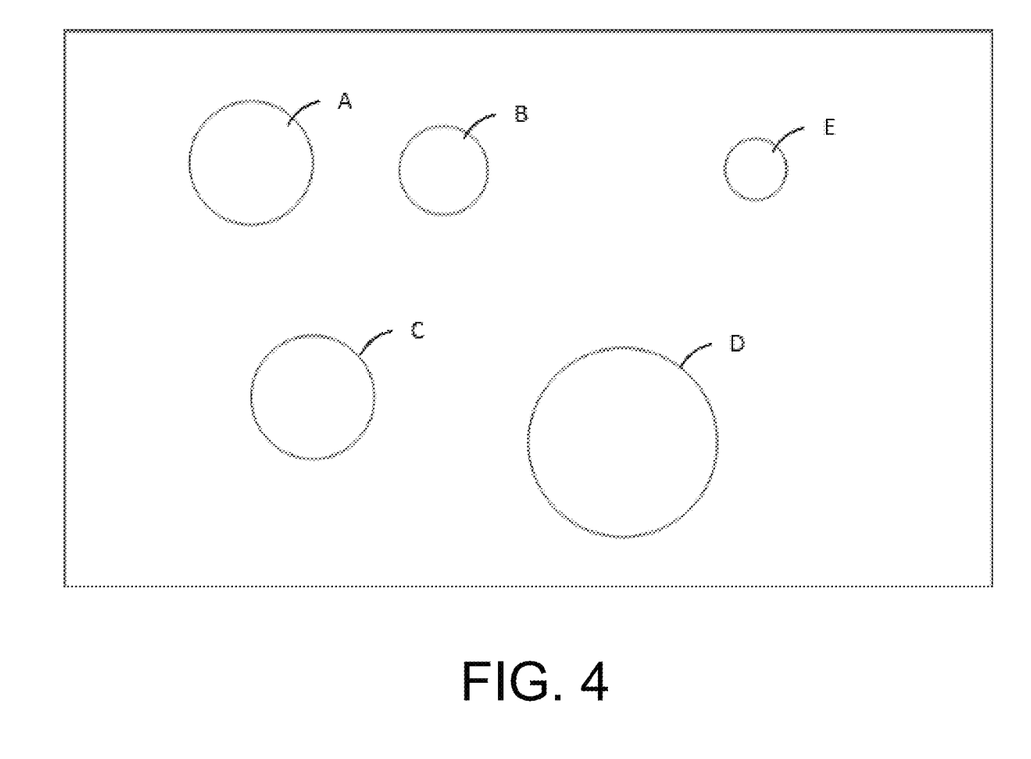
FIG. 4 is a schematic diagram of an attention focus position of a user in a panoramic video picture.
Figure 5:
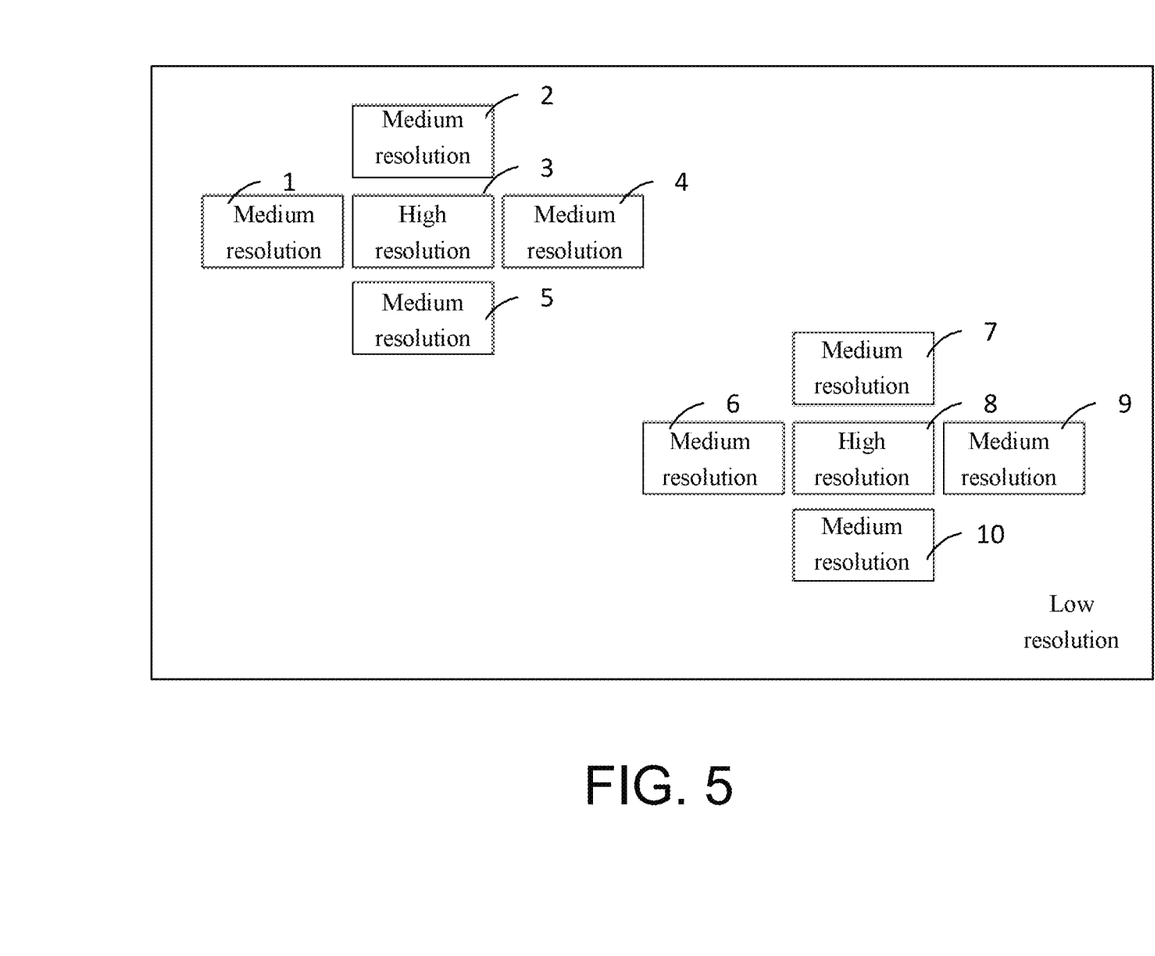
FIG. 5 is a schematic diagram of resolution distribution in a panoramic video picture.

In order to better understand the method and device for picture quality assessment after dynamic panoramic video stream cropping provided in the present application, embodiments of the present application also provide a detailed description of a specific application example. Referring to FIGS. 3-5, FIG. 3 is a flow chart of another method for picture quality assessment after dynamic panoramic video stream cropping according to the present application; FIG. 4 is a schematic diagram of an attention focus position of a user in a panoramic video picture; and FIG. 5 is a schematic diagram of resolution distribution in a panoramic video picture. The method for picture quality assessment after dynamic panoramic video stream provided in the present application takes the case where the attention focus position of the user includes the picture horizontal angle and the picture vertical angle as an example for description, and the method includes:

S301, an attention focus parameter $F(x, y)$ is obtained according to an attention focus position of a user.

The picture of a panoramic video may be divided into a plurality of circular regions according to the attention focus position of the user. FIG. 4 illustrates that in a frame, the attention focus position of the user at a certain time may be circular region A, B, C, D or E (the greater the diameter of the circular region, the more the people viewing the region, and non-circular regions in FIG. 4 are regions having less interest of the user) shown in the figure. For example, sight lines of eyes of the user are caught to obtain the attention focus position of the user being the picture horizontal angle of 60 degrees and the picture vertical angle of 150 degrees, assuming that the attention focus position is within region A in FIG. 4, $F(x, y)$ is a function of 60 degrees and 150 degrees.

S302, a resolution estimated value of the attention focus position of each user of a video picture is generated according to the attention focus parameter $F(x, y)$.

S303, a resolution distribution parameter $P(x, y)$ is generated according to the resolution estimated value of the attention focus position of each user of a video picture.

The picture of the panoramic video may be divided into a plurality of rectangular regions to set different resolutions (the resolutions are preset). FIG. 5 illustrates that in a frame, the resolution distribution of the picture may be rectangular regions 1-10 (non-rectangular regions in FIG. 5 are regions having lower resolutions) shown in the figure. For example, the corresponding resolution distribution is region 3 (high-resolution) when the picture horizontal angle is 60 degrees and the picture vertical angle is 150 degrees, and the resolution distribution parameter $P(x, y)$ is obtained by taking the resolution distribution of region 3. $P(x, y)$ is the resolution distribution parameter obtained when the current attention focus position of the user is the picture horizontal angle of 60 degrees and the picture vertical angle of 150 degrees. The resolution estimated value may be adjusted to adjust the resolution distribution parameter $P(x, y)$.

S304, a picture quality parameter Q in the period of a play time of a panoramic video is obtained, wherein, $Q=\int_0^{2\pi}\int_0^{\pi}\int_0^{Te}F_t(x,y)P_t(x,y)dxdydt$, wherein, $2\pi$ is the maximum value of the picture horizontal angle, $\pi$ is the maximum value of the picture vertical angle, and Te is the play end time of the video.

S305, picture quality parameters Q of a plurality of users are obtained to obtain an average value QE.

The picture quality parameter Q is calculated according to data of a single user. The attention focus parameter of each user may slightly vary, resulting in different video picture quality obtained according to data of each user. The picture quality parameters of a plurality of users may be obtained through S301-S303, the average value QE of the picture quality parameters of a plurality of users may be taken as the picture quality of the whole video, i.e. $QE=Avg\ (\pi_{i=1}^N Q)$ wherein, N is the number of users. QE is used for assessing the picture quality of a current vide picture generated by stream cropping.

S306, the average value QE is compared with a preset quality parameter $Q_0$ to obtain an assessment that the picture quality does not satisfy a requirement when QE is less than $Q_0$.

$Q_0$ is the preset quality parameter and is a reference standard for picture quality. If QE is less than $Q_0$, it indicates that the current picture does not satisfy the quality requirement, the quality is too low, and adjustments may be made to the picture quality, on the contrary, it indicates that the current picture satisfies the quality requirement. When the current picture does not satisfy the quality requirement, the resolution estimated value may be adjusted, or stream cropping is performed on the picture according to the attention focus position of the user to enable the picture quality to satisfy the quality requirement. When the picture quality is too high, the picture quality may properly be reduced to reduce the play cost.

In this way, the picture instruction assessment and adjustment processes of the method for picture quality assessment after dynamic panoramic video stream cropping of the present application are completed.

The method and device for picture quality assessment after dynamic panoramic video stream cropping provided in the present application introduce the attention focus parameter and the resolution distribution parameter to assess the picture quality of the panoramic video, and the attention focus parameter and the resolution distribution parameter are combined to assess the picture quality; the present application provides a standard to assess the picture quality for reference, and guarantees the picture quality and play effect of the panoramic video, wherein the attention focus parameter can represent the attention level of the user to the picture, and the resolution distribution parameter can represent the resolution distribution of the picture; the assessment results are closer to the real experience of the user, the picture quality can be assessed, and the assessment effect is good, in favor of an improved user experience.

As used herein, the terms "component", "module", "system", "interface", "process" and the like are generally intended to refer to a computer-related entity: hardware, a combination of hardware and software, software, or software in execution. For example, a component may be, but is not limited to, a process running on a processor, a processor, an object, an executable application, a thread of execution, a program, and/or a computer. By means of illustration, both an application running on a controller and the controller can be components. One or more components may exist within processes and/or threads of execution, and the components may be located on one computer and/or distributed between two or more computers.

Various operations of the embodiments are provided herein. In one embodiment, the one or more operations may constitute computer readable instructions stored on one or more computer readable media that, when executed by an electronic device, will cause the computing device to perform the operations. The order in which some or all of the operations are described should not be interpreted as implying that these operations must be order dependent. Those skilled in the art will understand alternative ordering having the benefit of this specification. Moreover, it should be understood that not all operations are necessarily present in each of the embodiments provided herein.

Moreover, the word "preferred" as used herein is intended to be used as an instance, example, or illustration. Any aspect or design described herein as "preferred" is not necessarily to be construed as more advantageous than other aspects or designs. On the contrary, the use of the word "preferred" is intended to present the concept in a specific way. The term "or" as used in the present application is intended to mean inclusive "or" rather than exclusive "or". That is, unless otherwise specified or clear from the context, "X uses A or B" means naturally including any one that is listed. That is, if X uses A; X uses B; or X uses both A and B, then "X uses A or B" is satisfied in any of the preceding examples.

Moreover, although the present disclosure has been shown and described with respect to one or more implementations, equivalent variations and modifications will occur to those skilled in the art upon reading and understanding the specification and drawings. The present disclosure includes all such modifications and variations and is limited only by the scope of the appended claims. In particular, with respect to various functions performed by the above-mentioned components (elements, resources, etc.), the terms used to describe such components are intended to correspond to any component (unless otherwise indicated) that performs the specified function (e.g., it is functionally equivalent) of the component, even though structurally different from the disclosed structure that performs the function in the exemplary implementation of the present disclosure shown herein. Furthermore, although a particular feature of the present disclosure has been disclosed with respect to only one of several implementations, such feature may be combined with one or more other features of other implementations as may be desirable and advantageous for a given or particular application. Furthermore, to the extent that the terms "comprise", "have", "contain" or variations thereof are used in specific embodiments or claims, such terms are intended to comprise in a manner similar to the term "include".

Functional units in the embodiments of the present invention can be integrated into one processing module, or physically exist separately, or two or more units can be integrated into one module. The above integrated module can be implemented in the form of hardware or a software functional module. If the integrated module is implemented in the form of a software functional module and sold or used as an independent product, it may also be stored in a computer readable storage medium. The storage medium mentioned above may be a read-only memory, a magnetic disk or an optical disk, etc. Each device or system described above can execute the method in the corresponding method embodiment.

Therefore, although the present application has been disclosed in the preferred embodiments, it is not intended to limit the present application, and various modifications and modifications can be made by those skilled in the art without departing from the spirit and scope of the present application, and the scope of the present application shall be defined by the appended claims.

What is claimed is:

1. A method for picture quality assessment after dynamic panoramic video stream cropping, comprising:
   catching sight lines of eyes of a user and obtaining a position of an attention focus position of the user in a picture to obtain an attention focus parameter of the user, the attention focus parameter being used for representing an attention level of the user to the picture, and the attention focus parameter being a function of the attention focus position of the user;
   generating a resolution estimated value of the attention focus position of each user of a video picture according to the attention focus parameter, and generating a resolution distribution parameter according to the resolution estimated value of the attention focus position of each user of a video picture, the resolution distribution parameter being used for representing resolution distribution, the resolution distribution parameter being a function of the attention focus position of the user, wherein the attention focus position of the user comprises a picture horizontal angle and/or a picture vertical angle;
   combining the attention focus parameter and the resolution distribution parameter to obtain a picture quality parameter; and
   assessing picture quality of a panoramic video that the user views currently according to the picture quality parameter.

2. The method for picture quality assessment after dynamic panoramic video stream cropping of claim 1, wherein the combining the attention focus parameter and the resolution distribution parameter to obtain a picture quality parameter comprises:
   integrating the attention focus parameter and the resolution distribution parameter to obtain the picture quality parameter.

3. The method for picture quality assessment after dynamic panoramic video stream cropping of claim 2, wherein the integrating the attention focus parameter and the resolution distribution parameter to obtain the picture quality parameter comprises:
   integrating the attention focus parameter and the resolution distribution parameter over the picture horizontal angle to obtain a picture quality parameter Q of each frame, $Q=\int_0^{2\pi}F(x)P(x)dx$, wherein, $F(x)$ is the attention focus parameter, $P(x)$ is the resolution distribution parameter, and the attention focus position of the user comprises the picture horizontal angle; or
   integrating the attention focus parameter and the resolution distribution parameter over the picture horizontal angle and the picture vertical angle to obtain a picture quality parameter Q of each frame, $Q=\int_0^{2\pi}\int_0^{\pi}F(x,y)P(x,y)dxdy$, wherein, $F(x, y)$ is the attention focus parameter, $P(x, y)$ is the resolution distribution parameter, and the attention focus position of the user comprises the picture horizontal angle and the picture vertical angle.

4. The method for picture quality assessment after dynamic panoramic video stream cropping of claim 2, wherein the integrating the attention focus parameter and the resolution distribution parameter to obtain the picture quality parameter comprises:
   integrating the attention focus parameter and the resolution distribution parameter over the picture horizontal angle, the picture vertical angle and a play time of the panoramic video to obtain a picture quality parameter Q of the panoramic video in a period of the play time, $Q=\int_0^{2\pi}\int_0^{\pi}\int_0^{Te}F_t(x,y)P_t(x,y)dxdydt$, wherein, $F_t(x, y)$ is the attention focus parameter in the play time of the panoramic video, $P_t(x, y)$ is the resolution distribution parameter in the play time of the panoramic video, Te is a play end time of the video, and the attention focus position of the user comprises the picture horizontal angle and the picture vertical angle.

5. The method for picture quality assessment after dynamic panoramic video stream cropping of claim 1, wherein the obtaining the attention focus parameter comprises:
   obtaining an attention focus position of a single user to obtain the attention focus parameter; or
   obtaining attention focus positions of a plurality of users and obtaining the attention focus parameter according to the attention focus positions of a plurality of users, correspondingly, the obtaining the resolution distribution parameter comprises: generating a corresponding resolution estimated value of the attention focus position of each user of a video picture according to the attention focus parameters, and generating a corresponding resolution distribution parameter according to the resolution estimated value of the attention focus position of each user of a video picture.

6. A method for picture quality assessment after dynamic panoramic video stream cropping, comprising:
   obtaining an attention focus parameter, the attention focus parameter being used for representing an attention level of a user to a picture, and the attention focus parameter being a function of an attention focus position of the user;
   obtaining a resolution distribution parameter, the resolution distribution parameter being used for representing resolution distribution of the picture, and the resolution distribution parameter being a function of the attention focus position of the user, wherein the attention focus position of the user comprises a picture horizontal angle and/or a picture vertical angle;
   combining the attention focus parameter and the resolution distribution parameter to obtain a picture quality parameter; and
   assessing picture quality of a panoramic video that the user views currently according to the picture quality parameter.

7. The method for picture quality assessment after dynamic panoramic video stream cropping of claim 6, wherein the obtaining the resolution distribution parameter comprises:
   generating a resolution estimated value of the attention focus position of each user of a video picture according to the attention focus parameter, and generating the resolution distribution parameter according to the resolution estimated value of the attention focus position of each user of the video picture.

8. The method for picture quality assessment after dynamic panoramic video stream cropping of claim 6, wherein the combining the attention focus parameter and the resolution distribution parameter to obtain the picture quality parameter comprises:
   integrating the attention focus parameter and the resolution distribution parameter to obtain the picture quality parameter.

9. The method for picture quality assessment after dynamic panoramic video stream cropping of claim 8, wherein the integrating the attention focus parameter and the resolution distribution parameter to obtain the picture quality parameter comprises:
   integrating the attention focus parameter and the resolution distribution parameter over the picture horizontal angle to obtain a picture quality parameter Q of each frame, $Q=\int_0^{2\pi}F(x)P(x)dx$, wherein, $F(x)$ is the attention focus parameter, $P(x)$ is the resolution distribution parameter, and the attention focus position of the user comprises the picture horizontal angle; or
   integrating the attention focus parameter and the resolution distribution parameter over the picture horizontal angle and the picture vertical angle to obtain a picture quality parameter Q of each frame, $Q=\int_0^{2\pi}\int_0^{\pi}F(x,y)P(x,y)dxdy$, wherein, $F(x, y)$ is the attention focus parameter, $P(x, y)$ is the resolution distribution parameter, and the attention focus position of the user comprises the picture horizontal angle and the picture vertical angle.

10. The method for picture quality assessment after dynamic panoramic video stream cropping of claim 8, wherein the integrating the attention focus parameter and the resolution distribution parameter to obtain the picture quality parameter comprises:
    integrating the attention focus parameter and the resolution distribution parameter over the picture horizontal angle, the picture vertical angle and a play time of the panoramic video to obtain a picture quality parameter Q of the panoramic video in a period of the play time, $Q=\int_0^{2\pi}\int_0^{\pi}\int_0^{Te}F_t(x,y)P_t(x,y)dxdydt$, wherein, $F_t(x, y)$ is the attention focus parameter in the play time of the panoramic video, $P_t(x, y)$ is the resolution distribution parameter in the play time of the panoramic video, Te is a play end time of the video, and the attention focus position of the user comprises the picture horizontal angle and the picture vertical angle.

11. The method for picture quality assessment after dynamic panoramic video stream cropping of claim 6, wherein the obtaining the attention focus parameter comprises:
catching sight lines of eyes of a user and obtaining a position of an attention focus position of the user in a picture to obtain an attention focus parameter of the user.

12. The method for picture quality assessment after dynamic panoramic video stream cropping of claim 6, wherein the obtaining the attention focus parameter comprises:
obtaining an attention focus position of a single user to obtain the attention focus parameter; or
obtaining attention focus positions of a plurality of users and obtaining the attention focus parameter according to the attention focus positions of a plurality of users, correspondingly, the obtaining the resolution distribution parameter comprises: generating a corresponding resolution estimated value of the attention focus position of each user of a video picture according to the attention focus parameters, and generating a corresponding resolution distribution parameter according to the resolution estimated value of the attention focus position of each user of a video picture.

13. A device for picture quality assessment after dynamic panoramic video stream cropping, comprising:
a processor configured to:
obtain an attention focus parameter and a resolution distribution parameter, the attention focus parameter being used for representing an attention level of a user to a picture, the resolution distribution parameter being used for representing resolution distribution of the picture, both of the attention focus parameter and the resolution distribution parameter being a function of an attention focus position of the user, wherein the attention focus position of the user comprises a picture horizontal angle and/or a picture vertical angle;
combine the attention focus parameter and the resolution distribution parameter obtained by the processor to obtain a picture quality parameter; and
assess picture quality of a panoramic video that the user views currently according to the picture quality parameter obtained by the processor.

14. The device for picture quality assessment after dynamic panoramic video stream cropping of claim 13, wherein the processor is configured to, when obtaining the resolution distribution parameter, execute: generating a resolution estimated value of the attention focus position of each user of a video picture according to the obtained attention focus parameter, and generating the resolution distribution parameter according to the resolution estimated value of the attention focus position of each user of a video picture.

15. The device for picture quality assessment after dynamic panoramic video stream cropping of claim 13, wherein the processor is configured to integrate the attention focus parameter and the resolution distribution parameter obtained by the processor to obtain the picture quality parameter, comprises:
integrating the attention focus parameter and the resolution distribution parameter over the picture horizontal angle to obtain a picture quality parameter Q of each frame, $Q=\int_0^{2\pi} F(x)P(x)dx$, wherein, $F(x)$ is the attention focus parameter, $P(x)$ is the resolution distribution parameter, and the attention focus position of the user comprises the picture horizontal angle; or
integrating the attention focus parameter and the resolution distribution parameter over the picture horizontal angle and the picture vertical angle to obtain a picture quality parameter Q of each frame, $Q=\int_0^{2\pi}\int_0^{\pi} F(x,y)P(x,y)dxdy$, wherein, $F(x, y)$ is the attention focus parameter, $P(x, y)$ is the resolution distribution parameter, and the attention focus position of the user comprises the picture horizontal angle and the picture vertical angle; or
integrating the attention focus parameter and the resolution distribution parameter over the picture horizontal angle, the picture vertical angle and a play time of the panoramic video to obtain a picture quality parameter Q of the panoramic video in a period of the play time, $Q=\int_0^{2\pi}\int_0^{\pi}\int_0^{Te} F_t(x,y)P_t(x,y)dxdydt$, wherein, $F_t(x, y)$ is the attention focus parameter in the play time of the panoramic video, $P_t(x, y)$ is the resolution distribution parameter in the play time of the panoramic video, Te is a play end time of the video, and the attention focus position comprises the picture horizontal angle and the picture vertical angle.

16. The method for picture quality assessment after dynamic panoramic video stream cropping of claim 7, wherein the combining the attention focus parameter and the resolution distribution parameter to obtain the picture quality parameter comprises:
integrating the attention focus parameter and the resolution distribution parameter to obtain the picture quality parameter.

17. The method for picture quality assessment after dynamic panoramic video stream cropping of claim 7, wherein the obtaining the attention focus parameter comprises:
catching sight lines of eyes of a user and obtaining a position of an attention focus position of the user in a picture to obtain an attention focus parameter of the user.

18. The method for picture quality assessment after dynamic panoramic video stream cropping of claim 7, wherein the obtaining the attention focus parameter comprises:
obtaining an attention focus position of a single user to obtain the attention focus parameter; or
obtaining attention focus positions of a plurality of users and obtaining the attention focus parameter according to the attention focus positions of a plurality of users, correspondingly, the obtaining the resolution distribution parameter comprises: generating a corresponding resolution estimated value of the attention focus position of each user of a video picture according to the attention focus parameters, and generating a corresponding resolution distribution parameter according to the resolution estimated value of the attention focus position of each user of a video picture.

19. The device for picture quality assessment after dynamic panoramic video stream cropping of claim 14, wherein the processor is configured to integrate the attention focus parameter and the resolution distribution parameter obtained by the processor to obtain the picture quality parameter, comprises:
integrating the attention focus parameter and the resolution distribution parameter over the picture horizontal angle to obtain a picture quality parameter Q of each frame, $Q=\int_0^{2\pi} F(x)P(x)dx$, wherein, F(x) is the attention focus parameter, P(x) is the resolution distribution parameter, and the attention focus position of the user comprises the picture horizontal angle; or integrating the attention focus parameter and the resolution distribution parameter over the picture horizontal angle and the picture vertical angle to obtain a picture quality parameter Q of each frame, $Q=\int_0^{2\pi}\int_0^{\pi} F(x,y)P(x,y)dxdy$, wherein, F(x, y) is the attention focus parameter, P(x, y) is the resolution distribution parameter, and the attention focus position of the user comprises the picture horizontal angle and the picture vertical angle; or integrating the attention focus parameter and the resolution distribution parameter over the picture horizontal angle, the picture vertical angle and a play time of the panoramic video to obtain a picture quality parameter Q of the panoramic video in a period of the play time, $Q=\int_0^{2\pi}\int_0^{\pi}\int_0^{Te} F_t(x,y)P_t(x,y)dxdydt$, wherein, $F_t(x, y)$ is the attention focus parameter in the play time of the panoramic video, $P_t(x, y)$ is the resolution distribution parameter in the play time of the panoramic video, Te is a play end time of the video, and the attention focus position comprises the picture horizontal angle and the picture vertical angle.

* * * * *